United States Patent [19]
Paulsen et al.

[11] 3,802,554
[45] Apr. 9, 1974

[54] CONVEYOR BELT CLEANING DEVICE

[75] Inventors: Lewis A. Paulsen, Belleville; John W. Smith, Birmingham, both of Mich.

[73] Assignee: Edward C. Levy Company, Detroit, Mich.

[22] Filed: Apr. 23, 1973

[21] Appl. No.: 353,592

Related U.S. Application Data

[63] Continuation-in-part of Ser. No. 220,223, Jan. 24, 1972, abandoned.

[52] U.S. Cl. ............................... 198/230, 198/229
[51] Int. Cl. ........................................... B65g 45/00
[58] Field of Search ..................... 198/229, 230, 208

[56] References Cited
UNITED STATES PATENTS

| | | | |
|---|---|---|---|
| 3,430,758 | 3/1969 | Searles | 198/230 |
| 3,315,794 | 4/1967 | Ellington | 198/230 |
| 2,647,619 | 8/1953 | Green | 198/230 |

Primary Examiner—Evon C. Blunk
Assistant Examiner—Joseph E. Valenza
Attorney, Agent, or Firm—Harness, Dickey & Pierce

[57] ABSTRACT

A device for removing particulate material which clings to the surface of an endless conveyor belt. A pivoted frame beneath the exit end of the belt has a pair of parallel rollers at one end, one above and one below the return side of the belt. The frame is urged in a direction causing the rollers to kink the belt as it passes therethrough, so that the material will drop off. The roller radius is no more than six times the belt thickness and the horizontal roller spacing is no more than twenty times the belt thickness. In a modified construction, three rollers are used, one above and two below the belt.

13 Claims, 7 Drawing Figures

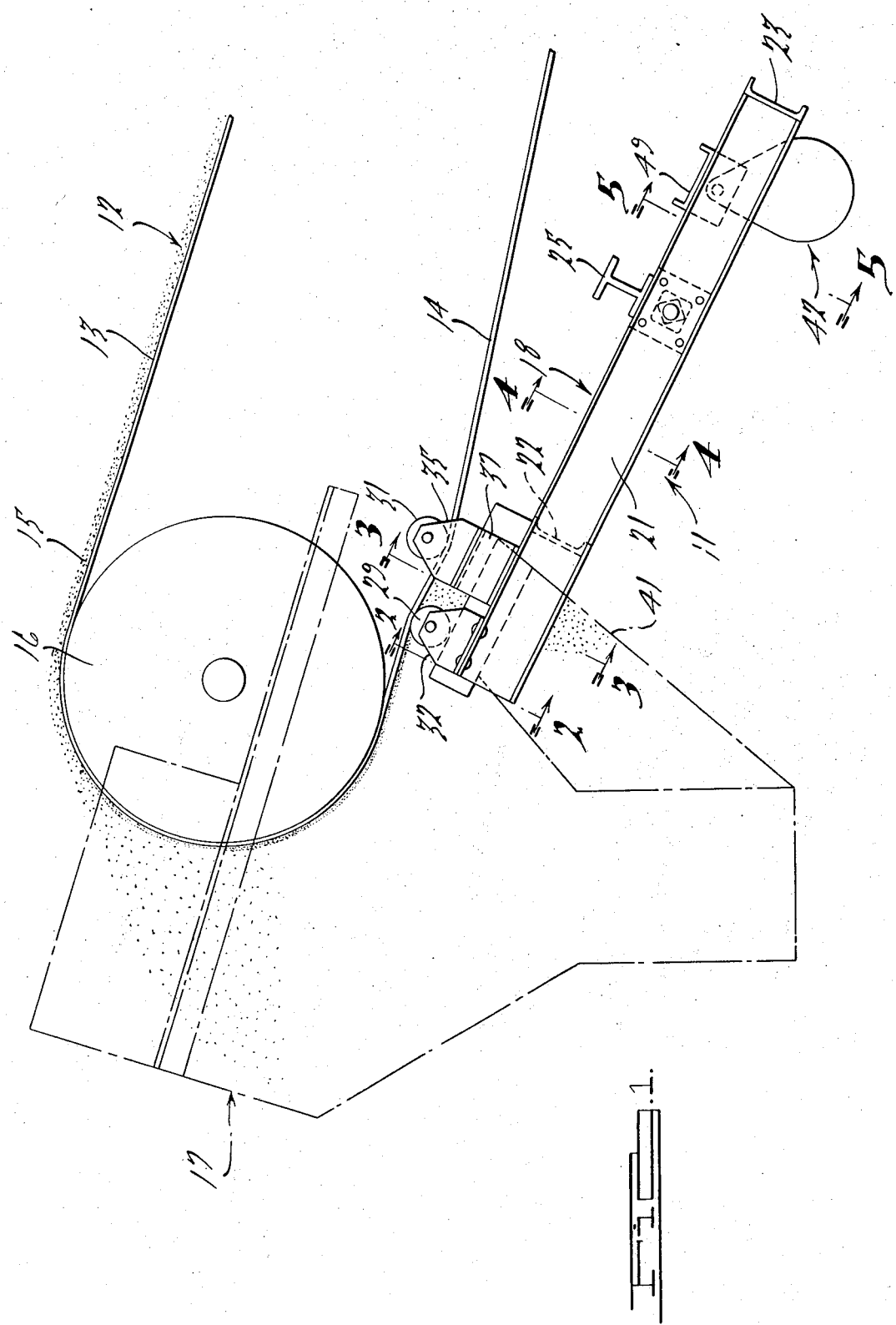

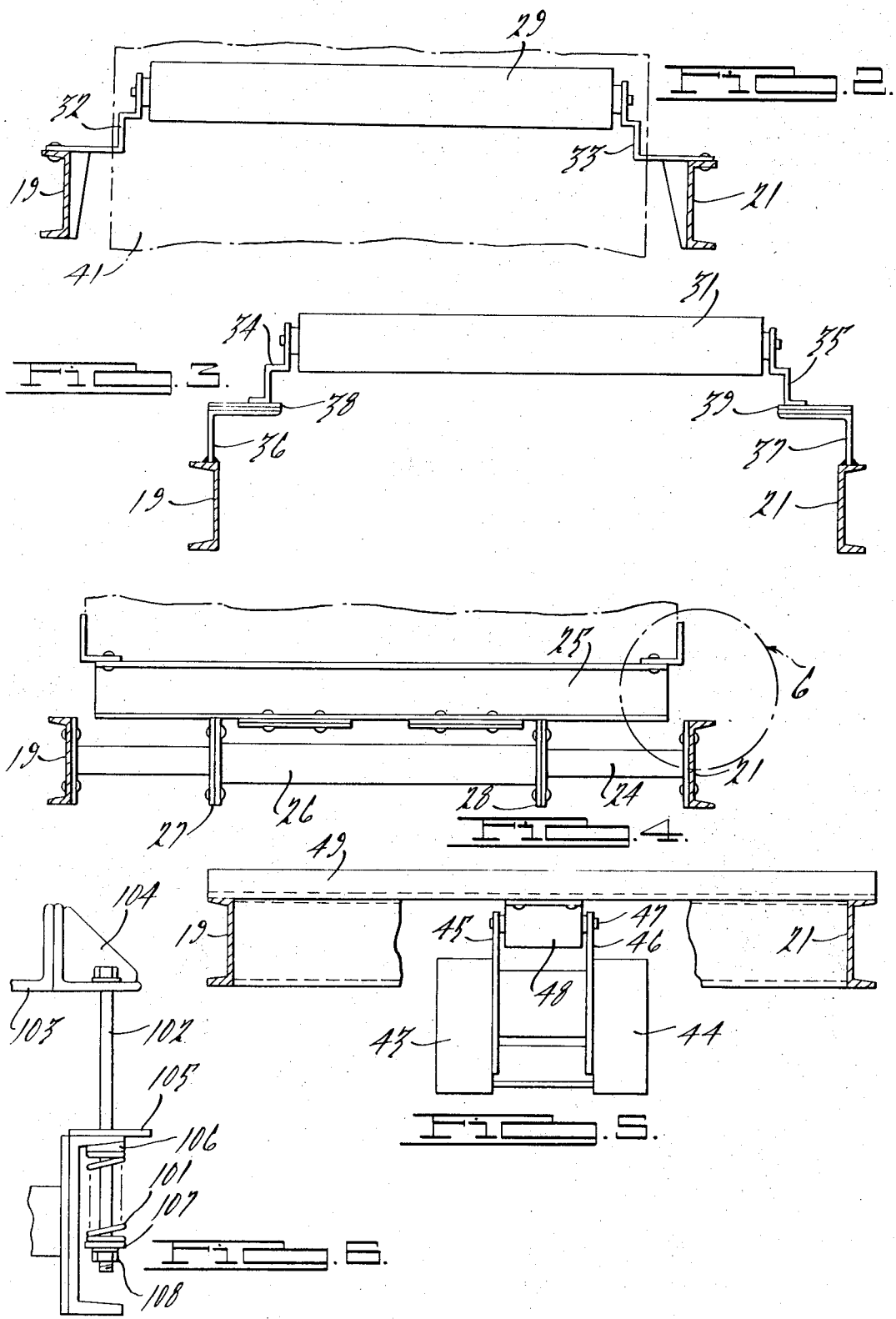

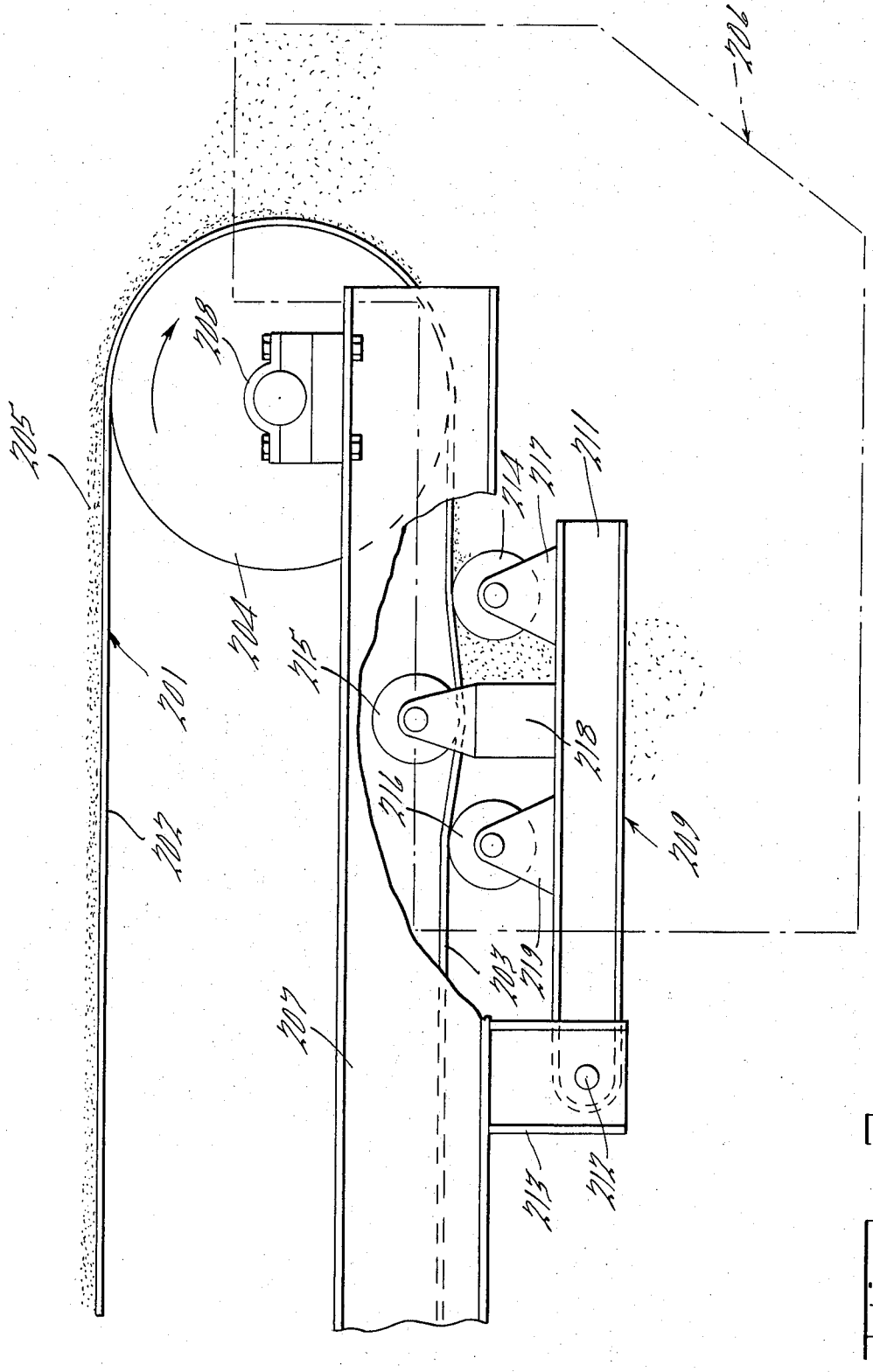

2

CONVEYOR BELT CLEANING DEVICE

This application is a continuation-in-part of application Ser. No. 220,223, filed Jan. 24, 1972 now abandoned, by the same applicants and entitled "Conveyor Belt Cleaning Device."

BACKGROUND AND BRIEF SUMMARY OF THE INVENTION

The invention relates to the transport and delivery of small particulate material such as fine aggregates by endless conveyor belts, and more particularly to means for dislodging particles which cling to the belt surface after the bulk of material has dropped off.

It is an object of the invention to provide a novel and improved belt cleaning device which is simple, economical and efficient construction and will utilize the movement of the belt itself to remove small particulate material.

Briefly, the invention comprises a frame rockably mounted below the return run adjacent the exit end of the belt, with at least two rollers at one end of the frame engaging opposite sides of the belt. The roller radius is no more than six times the belt thickness and the horizontal spacing between rollers is no more than twenty times the belt thickness. Means are provided for urging the frame in a direction which will cause the pulleys to kink the belt as it passes therethrough. This kinking action will cause a high percentage of the material to drop from the belt.

In one embodiment of the invention, the frame urging means comprises a counterweight, and in a second embodiment spring means are provided. In a third embodiment of the invention, three rollers are provided and the frame urging means comprises the weight of the frame assembly itself.

BRIEF DESCRIPTION OF THE DRAWINGS

FIG. 1 is a partially schematic view showing the belt cleaning device of this invention, with a counterweight used to urge the rollers against the belt;

FIG. 2 is a fragmentary cross-sectional view taken along the line 2—2 of FIG. 1 and showing the manner in which the first roller is mounted on the frame;

FIG. 3 is a similar cross-sectional view taken along the line 3—3 of FIG. 1 showing the mounting of the second roller;

FIG. 4 is a fragmentary cross-sectional view taken along the line 4—4 of FIG. 1 and showing the mounting means for the frame;

FIG. 5 is a fragmentary cross-sectional view taken along the line 5—5 of FIG. 1 and showing the mounting of the counterweight;

FIG. 6 is a fragmentary view taken in the area marked 6 of FIG. 4 and showing a second embodiment of the invention using springs to urge the rollers against the belt; and FIG. 7 is a fragmentary side elevational view, partly sectioned, showing a third embodiment of the invention which utilizes three rollers and the weight of the frame assembly as its urging means.

DESCRIPTION OF THE PREFERRED EMBODIMENTS

Referring first to the embodiments of FIGS. 1–5, the device is generally indicated at 11 and is used in conjunction with a conveyor belt generally indicated at 12 having an upper run 13 and a lower run 14. Belt 12 may be fabricated for example of rubber or neoprene with a fabric core and is used for conveying particulate material 15 such as finely powdered slag or the like. The belt rides over an idler pulley 16 so that material 15 is delivered to a chute shown in dot-dash lines and generally indicated at 17. Normally, however, some of this material will cling to the belt along the return run 14.

Unit 11 comprises a frame generally indicated at 18 of rectangular shape, having side members 19 and 21 and cross members 22 and 23. Device 11 is located below return run 14 of the belt and immediately adjacent pulley 16. Frame 18 is rockably mounted by a pivot pin 24 to a stationary beam 25, as seen in FIG. 4. More particularly, beam 25 extends transversely to the frame and carries a sleeve 26 suspended therebelow by means of brackets 27 and 28. Pivot pin 24 extends between longitudinal frame members 19 and 21 and passes through sleeve 26.

The end frame 18 more closely adjacent pulley 16 carries a first or bottom roller 29 and a second or top roller 31. These rollers are positioned respectively below and above return run 14 of the belt immediately past pulley 16. The means for mounting these rollers on the frame is seen best in FIGS. 2 and 3. Roller 29 is rotatably mounted on a pair of brackets 32 and 33 mounted on frame members 19 and 21 respectively and extending inwardly and upwardly therefrom. Roller 31 is similarly mounted on brackets 34 and 35 which are supported above the frame by additional brackets 36 and 37 and shims 38 and 39. The lengths of these two rollers are preferably substantially the same as or slightly greater than the width of belt 12. The radius of each roller is no greater than six times the thickness of belt 12. The spacing between rollers 29 and 31 in the direction of lower run 14 of belt 12 is no greater than 20 times the belt thickness. It will be observed that chute 17 has an extension 41 so that rollers 29 and 31 are within the lateral confines of the chute, permitting released material to drop therein.

The means for urging rollers 29 and 31 against opposite sides of the belt comprises a counterweight generally indicated at 42 adjacent the end of frame 18 remote from the rollers. FIG. 5 shows the means for mounting this counterweight, which comprises two weights 43 and 44 with upwardly extending brackets 45 and 46 respectively. A pin 47 suspends these brackets from a member 48 carried below a cross beam 49 resting on frame members 19 and 21.

In operation, counterweight 42 will cause rollers 29 and 31 to be pressed against the lower and upper sides respectively of return run 14 of the belt. It will be observed in FIG. 1 that an imaginary tangent to the lower portions of pulley 16 and roller 31 will intersect roller 29. Due to this fact and the small size and short spacing between rollers 29 and 31, the portion of return run leaving pulley 16 will be subjected to a relatively sharp reversal or kinking, tending to compress and then expand the outer belt surface. It has been found that this action will automatically perform a cleaning function on the belt by causing accumulated particulate material to drop off into chute 17.

FIG. 6 shows a portion of a second embodiment of the invention which is basically similar to the previous embodiment but substitutes spring means for the counterweight which urges the rollers against the belt. The spring means is in the form of a pair of helical coil compression springs 101 on opposite sides of frame 18. These springs are mounted on rods 102 secured at their upper ends to stationary members 103 by brackets 104. The rods pass downwardly through plates 105 welded to the tops of frame members 19 and 21 and through the upper flanges of the frame members. Springs 101 are disposed between the frame member flanges, their upper ends engaging bevel washers 106 and their lower ends washers 107 held to the rods by nuts 108.

Springs 101 are located to the left of pivot pin 24 in FIG. 1 and urge frame 18 in a clockwise direction, thus pressing rollers 29 and 31 against the bottom and top respectively of return run 14 of the belt. The cleaning action of the device will therefore be the same as that of the previous embodiment.

It will be observed that in both forms of the invention the cleaning action will be carried out without inhibiting the freedom of action of the belt as it passes along its upper and lower runs and around pulley 16. The kinking movement of the belt caused by pressure of the rollers, while freeing particles therefrom, will not cause wear or abrasion of the belt itself, rollers 29 and 31 freely rotating as the belt moves.

FIG. 7 shows a third embodiment of the invention having a belt generally indicated at 201 with an upper run 202 and a lower run 203. The belt rides over an idler pulley 204 delivering material 205 to a chute shown in dot-dash lines and generally indicated at 206. The conveyor has a frame partly indicated at 207 which supports bearings 208 for pulley 204.

The belt cleaning unit is generally indicated at 208 and comprises a frame 211 of generally rectangular shape disposed beneath conveyor frame 207 adjacent pulley 204. The end of frame 211 remote from pulley 204 is pivotally mounted at 212 to bracket means 213 depending from frame 207.

Frame 211 carries three kinking rollers 214, 215 and 216. These three rollers are rotatably supported by means indicated at 217, 218 and 219 respectively carried by frame 211. Rollers 214 and 216 are disposed below lower run 203 and engageable with the underside thereof whereas roller 215, which is located between the other two rollers, is above run 203 and engages its upper surface. As in the previous embodiments, the radius of each of these three rollers is no more than six times the thickness of belt 201, and the spacing between adjacent rollers in the direction of run 203 is no greater than twenty times the belt thickness. A tangent connecting the tops of rollers 214 and 216 intersects the lower portion of roller 215. These constructional features of unit 209 will, as in the previous embodiments, subject lower run 203 to relatively sharp reversal or kinking, tending to compress, expand and then again compress the outer belt surface and remove accumulated particulate material which drops into chute 206.

The means for simultaneously urging the rollers and the belt together in this embodiment comprises the total weight of unit 209 which tends to urge all three rollers clockwise about pivot 212. The urging of this weight will cause rollers 214, 215 and 216 to kink lower run 203 as it passes therethrough so that the material will drop off.

We claim:

1. A cleaning device for removing particulate matter from the lower run of an endless conveyor belt supported by a pulley, comprising frame means adjacent said lower run, first and second rollers carried by said frame means adjacent each other, said lower run engaging said first and second rollers in succession, one of said rollers being below the lower run and the other above, the diameters of said rollers being substantially smaller than the diameter of said pulley to obtain relatively sharp kinking of said return run, and means simultaneously urging the rollers and belt together whereby the latter will be kinked as it passes between the rollers to dislodge particulate matter from its outer surface.

2. The combination according to claim 1, said frame means comprising a frame below said lower run rotatably carrying said rollers at one end thereof, and means rockably supporting said frame.

3. The combination according to claim 2, said frame supporting means being located at an intermediate portion thereof, said means urging the rollers and belt together comprising a counterweight connected to the end of the frame remote from said rollers.

4. The combination according to claim 2, said means urging the rollers and belt together comprising at least one spring urging said one end of the frame toward said lower run.

5. The combination according to claim 1, the radius of each roller being no greater than six times the belt thickness.

6. The combination according to claim 1, the distance between said rollers in the direction of said lower run being no greater than twenty times the belt thickness.

7. The combination according to claim 1, the radius of each roller being no greater than six times the belt thickness, and the distance between said rollers in the direction of said lower run being no greater than twenty times the belt thickness.

8. The combination according to claim 1, said first roller being below and said second roller above said lower run.

9. The combination according to claim 1, said frame means comprising a rectangular frame pivotally mounted at an intermediate portion thereof transversely to the extent of said belt, said first roller being below said belt and rotatably mounted at one end of said frame and said second roller above said belt and inwardly of said first roller, said urging means forcing said one end of the frame toward said lower run.

10. The combination according to claim 1, said frame means comprising a frame below said lower run and adjacent said pulley, a pivotal support for said frame at one end thereof and a third roller below said lower run, said second roller being located between the first and third rollers, said urging means comprising the weight of said frame and rollers.

11. The combination according to claim 10, said frame being pivotally supported at the end remote from said pulley.

12. In a cleaning device for a conveyor belt carrying particulate material toward a chute and passing over a pulley above said chute, first and second rollers adjacent said pulley and engageable successively with the outer and inner surfaces of the lower run thereof, the diameters of said rollers being substantially smaller than the diameter of said pulley to obtain relatively sharp kinking of said return run, and means simultaneously urging said rollers against said belt in opposite directions whereby the belt will be deformed as it passes between the rollers to free particulate material therefrom and permit the material to drop into said chute.

13. The combination according to claim 12, further provided with a third roller engageable with the outer surface of the lower belt run, the second roller being disposed between the first and third rollers, the radius of each roller being no greater than six times the belt thickness, the distance between adjacent rollers in the direction of the lower run being no greater than twenty times the belt thickness, and a frame supporting said rollers and pivotally supported at one end thereof, said urging means comprising the combined weight of said frame and rollers.

* * * * *